(12) United States Patent
Lu et al.

(10) Patent No.: US 6,643,731 B2
(45) Date of Patent: Nov. 4, 2003

(54) LOW COST MEMORY MANAGEMENT THAT RESISTS POWER INTERRUPTION

(75) Inventors: Xiaodan Hu Lu, Richardson, TX (US); Raymond J. Bonneau, Dallas, TX (US); John P. Powers, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 329 days.

(21) Appl. No.: 09/745,987

(22) Filed: Dec. 21, 2000

(65) Prior Publication Data

US 2001/0049764 A1 Dec. 6, 2001

Related U.S. Application Data

(60) Provisional application No. 60/174,103, filed on Dec. 31, 1999.

(51) Int. Cl.$^7$ .............................................. G06F 12/00
(52) U.S. Cl. ..................... 711/103; 711/145; 711/154; 711/163; 711/173
(58) Field of Search ................................ 711/103, 141, 711/144, 145, 154, 163, 170, 173

(56) References Cited

U.S. PATENT DOCUMENTS

| | | | | |
|---|---|---|---|---|
| 5,559,957 A | * | 9/1996 | Balk ............................ | 714/23 |
| 5,592,669 A | * | 1/1997 | Robinson et al. ........... | 707/206 |
| 5,701,429 A | * | 12/1997 | Legvold et al. ............. | 711/114 |
| 5,867,641 A | * | 2/1999 | Jenett ........................... | 714/7 |
| 5,896,393 A | * | 4/1999 | Yard et al. ................... | 714/710 |
| 6,038,636 A | * | 3/2000 | Brown et al. ................ | 711/103 |
| 6,282,624 B1 | * | 8/2001 | Kimura et al. .............. | 711/202 |
| 6,341,333 B1 | * | 1/2002 | Schreiber et al. ........... | 711/114 |

FOREIGN PATENT DOCUMENTS

EP       WO 94/20906       *  9/1994

* cited by examiner

*Primary Examiner*—Donald Sparks
*Assistant Examiner*—Brian R. Peugh
(74) *Attorney, Agent, or Firm*—Charles A. Brill; Wade James Brady, III; Frederick J. Telecky, Jr.

(57) ABSTRACT

A system and method for reliably managing a Flash ROM memory resource while preserving the integrity of the data held in the memory in spite of power outages that can occur during memory compressing operations. The memory management system uses three memory status registers to track the status to each page in the memory being managed. Two of the memory status registers give non-volatile memory and one is always determined to be the active memory status register. The third memory status register is located in RAM and used as a scratchpad. If the memory management routine determines the memory needs to be cleaned or compressed, the RAM memory status register is initialized and a swap segment is cleared. Valid pages are copied into the swap segment. After all of the valid pages from one application segment have been copied to the swap segment, the RAM memory status register is copied to a new valid non-volatile memory status register and the other non-volatile memory status register is erased at this time. The application segment is then cleaned. The swap segment is then copied to the cleaned application segment and any empty pages of the application segment are filled using additional valid data pages. The RAM memory status register is then copied to a new valid non-volatile memory status register and the process repeated for any remaining segments.

11 Claims, 4 Drawing Sheets

| MEMORY CONTENTS | SIZE | ADDRESS | PAGE |
|---|---|---|---|
| SYSTEM BOOT SEGMENT | 16K | 1F | 31 |
| CERTIFICATION AND MEMORY REGISTER | 8K | 1E | 30 |
| CERTIFICATION AND MEMORY REGISTER | 8K | | |
| SYSTEM MEMORY | 32K | 1D | 29 |
| | | 1C | 28 |
| | | 1B | 27 |
| | | 1A | 26 |
| SYSTEM BASE CODE | 64K | 19 | 25 |
| | | 18 | 24 |
| | | 17 | 23 |
| CERTIFICATE LIST | 32K | 16 | 22 |
| | | 15 | 21 |
| USER APPLICATIONS AND DATA | 32K | 14 | 20 |
| | | 13 | 19 |
| | | 12 | 18 |
| USER APPLICATIONS AND DATA | 64K | 11 | 17 |
| | | 10 | 16 |
| | | 1F | 15 |
| SWAP SEGMENT/USER APPLICATIONS AND DATA | 64K | 1E | 14 |
| | | 1D | 13 |
| | | 1C | 12 |
| | | 1B | 11 |
| SWAP SEGMENT/USER APPLICATIONS AND DATA | 64K | 1A | 10 |
| | | 09 | 9 |
| | | 08 | 8 |
| | | 07 | 7 |
| | | 06 | 6 |
| SYSTEM BASE CODE | 64K | 05 | 5 |
| | | 04 | 4 |
| | | 03 | 3 |
| | | 02 | 2 |
| SYSTEM BASE CODE | 64K | 01 | 1 |
| | | 00 | 0 |

REGISTER A

| | 23 | 22 | 21 | 20 | 19 | 18 | 17 | 16 | 15 | 14 | 13 | 12 | 11 | 10 | 9 | 8 |
|---|---|---|---|---|---|---|---|---|---|---|---|---|---|---|---|---|
| 1 | FE | FE | FC | FE | FC | FE | FE | FC | FE | FC | FF | 7E | FE | FE | FE | FE |
| 2 | FE | FE | FC | FE | FC | FE | FE | FC | FE | FC | FF | 7E | FE | FE | FE | FE |
| 3 | FE | FE | FC | FE | FC | FE | FE | FC | FE | FC | FF | 7E | FE | FE | FE | FE |
| 4 | FE | FE | FC | FE | FC | FE | FE | FC | FE | FC | FF | 7E | FE | FE | FE | FE |
| 5 | FE | FE | FC | FE | FC | FE | FE | FC | FE | FC | FF | 7E | FE | FE | FE | FE |
| 6 | FE | FE | FC | FE | FC | FE | FE | FC | FE | FC | FF | 7E | FE | FE | FE | FE |
| 7 | FE | FE | FC | FE | FC | FE | FE | FC | FE | FC | FF | 7E | FE | FE | FE | FE |
| 8 | FE | FE | FC | FE | FC | FE | FE | FC | FE | FC | FF | 7E | FC | FC | FC | FE |
| 9 | FE | FE | FC | FE | FC | FE | FE | FC | FE | FC | FF | 7E | FC | FC | FC | FE |
| 10 | FE | FE | FC | FE | FC | FE | FE | FC | FE | FC | FF | 7E | FC | FC | FC | FE |
| 11 | FE | FE | FE | FE | FE | FE | FE | FF | FE | FC | FF | 7E | FC | FC | FC | FF |
| 12 | FE | FE | FE | FE | FE | FE | FE | FF | FE | FC | FF | 7E | FC | FC | FC | FF |
| 13 | FE | FE | FE | FE | FE | FE | FE | FF | FE | FC | FF | 7E | FC | FC | FC | FF |
| 14 | FE | FE | FE | FE | FE | FE | FE | FF | FE | FC | FF | 7E | FC | FC | FC | FF |
| 15 | FE | FE | FE | FE | FE | FE | FE | FF | FE | FC | FF | 7E | FC | FC | FC | FF |
| 16 | FE | FE | FE | FE | FE | FE | FE | FF | FF | FF | FF | 7E | FF | FF | FF | FF |
| 17 | FE | FE | FE | FE | FE | FE | FE | FF | FF | FF | FF | 7E | FF | FF | FF | FF |
| 18 | FE | FE | FE | FE | FE | FE | FE | FF | FF | FF | FF | 7E | FF | FF | FF | FF |
| 19 | FE | FE | FE | FE | FE | FE | FE | FF | FF | FF | FF | 7E | FF | FF | FF | FF |
| 20 | FE | FE | FE | FE | FE | FE | FE | FF | FF | FF | FF | 7E | FF | FF | FF | FF |
| 21 | FE | FE | FE | FE | FE | FE | FE | FF | FF | FF | FF | 7E | FF | FF | FF | FF |
| 22 | FE | FE | FE | FE | FE | FE | FE | FF | FF | FF | FF | 7E | FF | FF | FF | 7C |

REGISTER B (TO FIG. 3B)

| | 23 | 22 | 21 | 20 | 19 | 18 | 17 | 16 | 15 | 14 | 13 | 12 | 11 | 10 | 9 | 8 |
|---|---|---|---|---|---|---|---|---|---|---|---|---|---|---|---|---|
| 1 | XX | XX | XX | XX | XX | XX | XX | XX | XX | XX | XX | XX | XX | XX | XX | XX |
| 2 | FE | FE | FC | FE | FC | FE | FE | FC | FE | FC | FF | 7E | FE | FE | FE | FE |
| 3 | FC | FC | FC | FC | FC | FC | FC | FC | FC | FC | FF | 7E | FE | FF | FF | FF |
| 4 | FC | FC | FC | FC | FC | FC | FC | FC | FC | FC | FF | 7E | FE | FF | FF | FF |
| 5 | FF | FF | FF | FF | FF | FF | FE | FC | FE | FC | FF | 7E | FC | FC | FC | FF |
| 6 | FF | FF | FF | FE | FE | FE | FE | FC | FE | FC | FF | 7E | FE | FE | FE | FF |
| 7 | FE | FE | FE | FE | FE | FE | FE | FC | FE | FC | FF | 7E | FE | FE | FE | FF |
| 8 | FE | FE | FE | FE | FE | FE | FE | FC | FE | FC | FF | 7E | FC | FC | FC | FF |
| 9 | FC | FC | FC | FC | FC | FC | FC | FC | FC | FC | FF | 7E | FC | FC | FC | FF |
| 10 | FE | FE | FE | FE | FE | FE | FE | FC | FE | FC | FF | 7E | FE | FE | FE | FF |
| 11 | FE | FE | FE | FE | FE | FE | FE | FF | FE | FC | FF | 7E | FE | FE | FE | FF |
| 12 | FE | FE | FE | FE | FE | FE | FE | FF | FF | FF | FF | 7E | FF | FF | FF | FF |
| 13 | FE | FE | FE | FE | FE | FE | FE | FF | FF | FF | FF | 7E | FF | FF | FF | FF |
| 14 | FE | FE | FE | FE | FE | FE | FE | FF | FC | FC | FF | 7E | FC | FC | FC | FF |
| 15 | FE | FE | FE | FE | FE | FE | FE | FF | FE | FE | FF | 7E | FE | FE | FE | FF |
| 16 | FE | FE | FE | FE | FE | FE | FE | FF | FF | FF | FF | 7E | FF | FF | FF | FF |
| 17 | FE | FE | FE | FE | FE | FE | FE | FF | FF | FF | FF | 7E | FF | FF | FF | FF |
| 18 | FE | FE | FE | FE | FE | FE | FE | FF | FF | FF | FF | 7E | FF | FF | FF | FF |
| 19 | FE | FE | FE | FE | FE | FE | FE | FF | FF | FF | FF | 7C | FF | FF | FF | 7E |
| 20 | FE | FE | FE | FE | FE | FE | FE | FF | FF | FF | FF | 7E | FF | FF | FF | 7E |
| 21 | FE | FE | FE | FE | FE | FE | FE | FF | FF | FF | FF | 7E | FF | FF | FF | 7E |
| 22 | FE | FE | FE | FE | FE | FE | FE | FF | FF | FF | FF | 7C | FF | FF | FF | 7C |

| | REGISTER C | | | | | | | | | | | | | | | |
|---|---|---|---|---|---|---|---|---|---|---|---|---|---|---|---|---|
| | 23 | 22 | 21 | 20 | 19 | 18 | 17 | 16 | 15 | 14 | 13 | 12 | 11 | 10 | 9 | 8 |
| 1 | XX | XX | XX | XX | XX | XX | XX | XX | XX | XX | XX | XX | XX | XX | XX | XX |
| 2 | XX | XX | XX | XX | XX | XX | XX | XX | XX | XX | XX | XX | XX | XX | XX | XX |
| 3 | XX | XX | XX | XX | XX | XX | XX | XX | XX | XX | XX | XX | XX | XX | XX | XX |
| 4 | XX | XX | XX | XX | XX | XX | XX | XX | XX | XX | XX | XX | XX | XX | XX | XX |
| 5 | FC | FC | FC | FC | FC | FE | FE | FC | FE | FC | FF | 7E | FE | FE | FE | FF |
| 6 | FC | FC | FC | FC | FC | FE | FE | FC | FE | FC | FF | 7E | FE | FE | FE | FF |
| 7 | FC | FC | FC | FC | FC | FE | FE | FC | FE | FC | FF | 7E | FE | FE | FE | FF |
| 8 | FC | FC | FC | FC | FC | FE | FE | FC | FE | FC | FF | 7E | FE | FE | FE | FF |
| 9 | FC | FC | FC | FC | FC | FE | FE | FC | FE | FC | FF | 7E | FE | FE | FE | FF |
| 10 | FC | FC | FC | FC | FC | FE | FE | FC | FE | FC | FF | 7E | FE | FE | FE | FF |
| 11 | FC | FC | FC | FC | FC | FE | FE | FC | FE | FC | FF | 7E | FE | FE | FE | FF |
| 12 | FE | FE | FE | FE | FC | FC | FC | FC | FE | FC | FF | 7E | FE | FF | FF | FF |
| 13 | FE | FE | FE | FE | FC | FC | FC | FC | FE | FC | FF | 7E | FE | FF | FF | FF |
| 14 | FE | FE | FE | FE | FC | FC | FC | FC | FE | FC | FF | 7E | FE | FF | FF | FF |
| 15 | FE | FE | FE | FE | FC | FC | FC | FC | FE | FC | FF | 7E | FE | FF | FF | FF |
| 16 | FE | FE | FE | FE | FC | FC | FC | FC | FE | FC | FF | 7E | FE | FF | FF | FF |
| 17 | FE | FE | FE | FE | FC | FC | FC | FC | FE | FC | FF | 7E | FE | FF | FF | FF |
| 18 | FE | FE | FE | FE | FC | FC | FC | FC | FE | FC | FF | 7E | FE | FF | FF | FF |
| 19 | FE | FE | FE | FE | FE | FE | FF | FF | FC | FC | FF | 7C | FF | FF | FF | 7E |
| 20 | FE | FE | FE | FE | FE | FE | FF | FF | FC | FC | FF | 7C | FF | FF | FF | 7E |
| 21 | FE | FE | FE | FE | FE | FE | FF | FF | FC | FC | FF | 7C | FF | FF | FF | 7E |
| 22 | FE | FE | FE | FE | FE | FE | FF | FF | FC | FC | FF | 7C | FF | FF | FF | 7E |

FROM FIG. 3A

*FIG. 3B*

LOW COST MEMORY MANAGEMENT THAT RESISTS POWER INTERRUPTION

This application claims priority under 35 USC §119(e)(1) of provisional application No. 60/174,103 filed Dec. 31, 1999.

FIELD OF THE INVENTION

This invention relates to the field of electronic memory management, more particularly to methods and systems for managing nonvolatile semiconductor memory, more particularly to methods and systems for managing nonvolatile semiconductor memory in small devices that are susceptible to power interruptions.

BACKGROUND OF THE INVENTION

Hand-held electronic devices are becoming more and more complex. Thanks to faster processors and much lower-priced memory, modem personal digital assistants (PDAs), computers, and calculators have much more capability than similar systems even a few years ago. At the same time, prices have fallen rapidly. Because of the small size and low power and price requirements, most hand-held devices do not have hard disk drives, or large amounts of read only memory (ROM).

Without a hard disk drive, calculators and personal digital assistants must provide non-volatile storage in which to store user data and application software. Some devices have turned to FLASH memory to answer the need for non-volatile memory. Flash memory shares some of the attributes of both random access memory RAM, which can be written to and read from many times, and ROM, which can be read from many times but only written to once. Flash memory can be written to and read from many times, but once a logic low, herein referred to as a "zero," is written to a location, the location will remain a zero until the location is erased. In other words, a location becomes a logic high, or "one," when it is erased and stays a one until a zero is written to it. Once a zero is written into the location a one written to the location will have no effect—it cannot become a one again until the location is erased. Further complicating matters is the requirement that an erase operation can only be performed on an entire segment of the memory, assumed to be 64 Kbytes for the purposes of this disclosure. Therefore, when a single bit must be changed from a zero to a one, every location in the entire segment is changed from its current state to a one.

An additional requirement is that the device must be extremely tolerant of power failures. Hand held devices often experience sudden power outages, when batteries are exhausted, changed, or knocked loose, or when an external power source is suddenly removed. Thus, a memory management scheme for a hand held device must not only be able to coordinate the usage and erasure of memory segments, but it must not lose track of the memory management tasks when power is removed at an inopportune time.

Existing memory management methods and systems are not tolerant of power failures, but either rely on the power remaining on until the memory management tasks complete, or on a backup power source. Relying on luck to maintain power during the memory management is acceptable in some applications in which the power rarely is interrupted or the data can quickly by recovered or reloaded. Devices used in applications in which loss of data is unacceptable use some sort of backup power supply, such as a lithium battery, that is only used to maintain the contents of the memory and is unlikely to be inadvertently removed or knocked loose. The backup power supply increases the cost of the device. What is needed is a memory management method and system that will efficiently manage non-volatile memory without information loss during power failures.

SUMMARY OF THE INVENTION

Objects and advantages will be obvious, and will in part appear hereinafter and will be accomplished by the present invention which provides a method and system for memory management that is resistant to errors caused by power failures. One embodiment of the claimed invention provides a method of managing memory usage. According to the method, the memory is organized in at least two segments, each segment comprising at least two pages. The method comprises the steps of: determining a sequence of memory pages, checking each page of memory in sequence to determine if the information in the memory page is valid, detecting a first invalid memory page in a first segment, copying valid memory pages from said first segment to a swap segment, erasing said first segment, copying said swap segment to said first segment, erasing said swap segment, and continuing with said checking step until all segments have been checked.

According to another embodiment, a memory management system is provided. The memory management system is comprised of a memory and three memory status registers. The memory has at least two segments, each of the two segments having at least two pages. The three memory status registers include a first and third non-volatile memory status register. Each of the three memory status registers has a memory location for storing the status of each page of the memory. The status indicating at least whether the corresponding page of memory contains valid information, invalid information, or no information. The first and third memory status registers capable of being designated a current memory status register. The memory management system copies the current memory status register to a second of the three memory statue registers and updates the status of the memory pages in the second memory status register as the memory is compressed. The second memory status register is periodically copied to a non-volatile memory status register which then becomes the current memory status register such that upon interruption of power, the memory management system is able to maintain the integrity of said memory.

The disclosed invention advantageously provides a very low-cost method and system for ensuring data will not be lost in spite of power outages. The non-volatile memory retains the valid data while the non-volatile memory status registers track what data is current and provide a fail-safe means of moving data between pages of the non-volatile memory that will not lose track of the valid data.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is one example of a memory map for a system

FIG. 3 is a listing of the contents of the three memory status registers during execution of the memory management shown in FIG. 2.

DETAILED DESCRIPTION OF THE PREFERRED EMBODIMENTS

Figure 2:
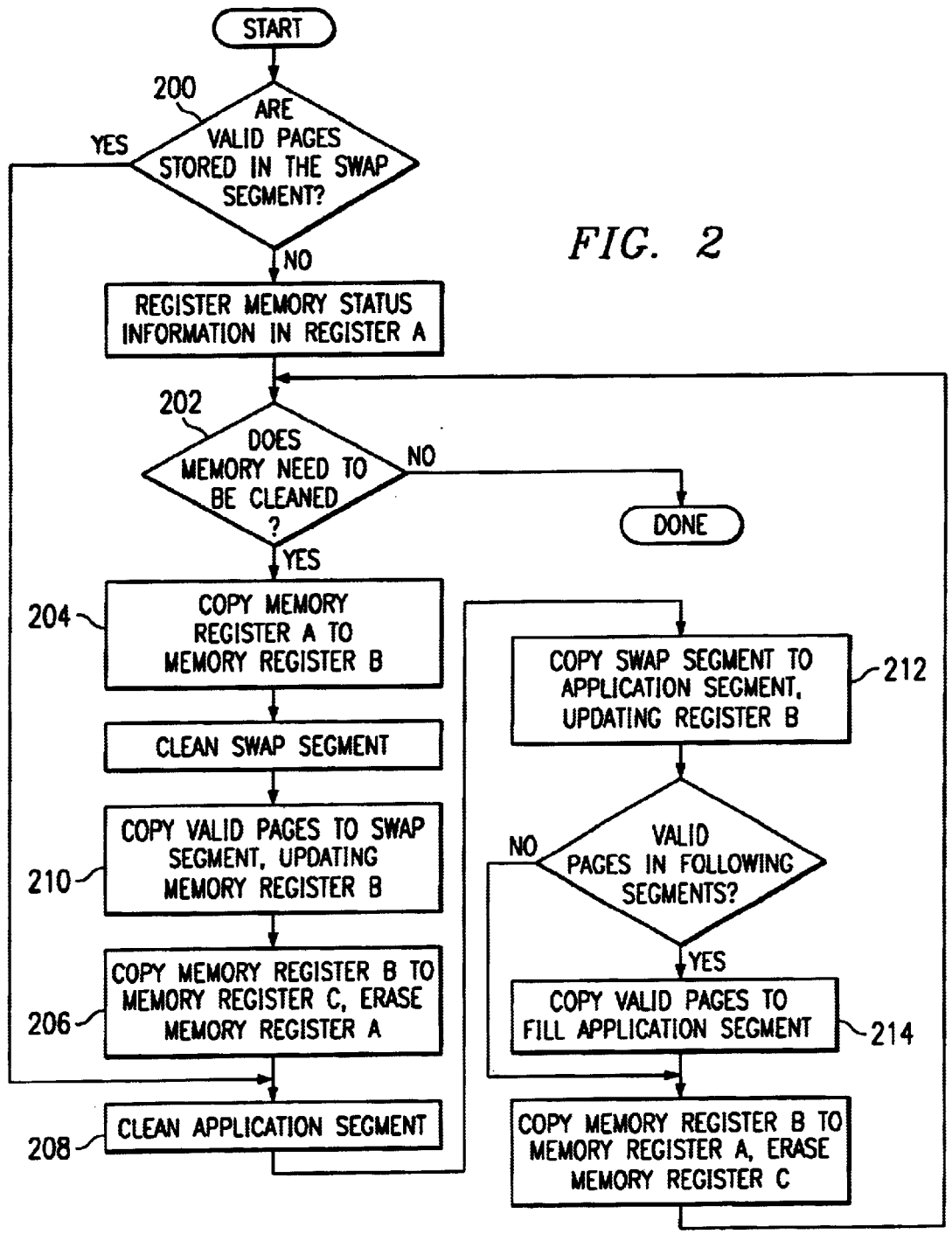
FIG. 2 is a flowchart of the memory management routine that performs memory cleaning and compression.

A new technique has been developed that provides efficient memory management and resistance to unexpected power outages. The technique enables the efficient use of a small non-volatile RAM memory in many systems, especially hand-held or remote systems. The technique maintains the integrity of the memory regardless of power outages without relying on a backup power source. The technique instead relies on a sequence of steps and state flags that ensure that, no matter when power is removed, upon power up the memory contents and status will be preserved.

The technique is especially useful to enable electronic distribution of proprietary software applications to hand-held devices, for example advanced graphing calculators. Since no media or license agreements are exchanged, the purchaser will have a difficult time establishing the right to use the software application if the copy stored in memory is lost.

The technique not only prevents loss of information during a power outage, but also manages the available memory to ensure the memory is used efficiently. Efficient use of the memory requires applications and data to be packed together such that as large of a free memory area as possible is established. For the purposes of this disclosure, system code is packed in the highest and lowest memory, with applications and data sharing a large memory region between the areas of system code. Since the system code is rarely, if ever, modified, the memory regions storing the system code will be largely ignored in this description and only the large memory region will be considered.

Although the techniques described herein are applicable to virtually any type of non-volatile memory, the technique will be described using a 512 k flash ROM, such as the AMD29F4000BT manufactured by Advanced Micro Devices. This flash ROM is organized as eight 32 k segments. The lower seven segments are cleared—reset to logic high data—an entire segment at a time. The lower seven segments are each comprised of four 16 k memory pages. The upper segment can be cleared in 8 k blocks. FIG. 1 is a memory map showing the allocation of the memory to system code, applications, data, and a swap segment.

In the case of hand-held calculators, applications include purchased software and programs written by the user of the device. The applications typically require large amounts of memory and are allocated memory in whole-page blocks. Within the memory, data is packed toward low memory and executable applications are packed toward high memory. When the memory management routines described herein are executed, unused pages between the applications are eliminated and the applications squeezed together in adjacent pages. While similar steps are taken to compress the data portions of the memory, the following description will focus on the compression of the application pages.

A key to the disclosed technique is the use of three memory registers to track and record the memory allocation and the status of the memory management operation. Two of the registers, "Register A" and "Register C," are located in the non-volatile flash ROM. The third register, "Register B," is stored in RAM-typically located in memory internal to the processor. In the embodiment described below, the two flash ROM status registers are located in the two separately erasable 8 k portions of memory page 30.

Each of the 8 k portions of page 30 has an 18-byte region set aside for one of the memory registers. The first byte is a memory management status byte. The lowest bit of the memory management status byte is set to a zero when the memory management routine is compressing the application memory. The second-lowest bit of the status byte is used to indicate which portion of the memory is being used as a swap segment. If the bit is a one, the lowest segment, disregarding memory set aside for the system code, is the swap segment. If the bit is a zero, the next lowest segment is used. The second byte of the region is used to indicate the last page used by any of the applications.

The remaining 16 bytes of each of the 18 byte regions are used to track the status of the 16 memory pages used by applications and data. One byte represents the status of each of the memory pages. Because the flash ROM is initialized as all ones and can only be changed from a one to a zero without resetting the entire segment, individual bits of each memory page status byte are cleared to indicate the progression of each page. Each pages may progress from a clean page (represented by ^FF), to a page currently being used by an application (represented by ^FE), to a page that is no longer being used and may now be erased (represented by ^FC). Data pages follow a similar progression, and additionally have the most significant bit cleared to indicated they are a data page. Thus, clean pages (^FF) become currently used data pages (^7E) and then no longer used data pages (^7C), which are then erased to create additional clean pages (^FF).

Memory Register A is located in the upper 8 k region of page 30, and Memory Register C is located in the lower 8 k region of page 30. Depending on the status of the memory management routine described below, either Memory Register A or Memory Register C is indicated as the currently valid memory register. As mentioned above, Memory Register B is located in processor RAM. At the beginning of the memory management routine, the current flash ROM memory register is copied to the Memory Register B. As the application and data information is moved, Memory Register B is updated to track the status and location of the memory pages. When portions of the routine are completed, Memory Register B is copied back to the flash ROM memory registers in alternate fashion. Should a power outage stop the memory management routine during execution, it will restart on power up of the device and be able to complete its operation without losing the contents of the valid memory pages.

FIG. 2 is a flowchart showing the operation of the memory management routine. The routine starts on power up and when called by other routines. Other routines may call the memory management routine when available memory is running low, when an application is deleted, when the user requests a memory clean up, or at other times. All other applications are stopped when the memory management routine is operating.

In block 200, the routine determines whether valid information is stored in the swap segment. Valid data in the swap segment indicates the device has suffered a power failure during a previous execution of the memory management routine. Assuming only invalid data is contained in the swap segment, the routine determines whether the memory needs to be cleaned as shown in block 202. To determine this, the routine reads the active memory status register, either memory Register A stored in the upper half of page 30, or Memory Register C stored in the lower half of page 30. For the following description it will be assumed that the active memory status register at the beginning of the routine is Memory Register A. As described above, clearing the most significant bit in a byte of the memory status register indicates the corresponding memory page is invalid. If there are no invalid pages, the memory needs not be cleaned and compressed, and the memory management routine ends.

If there are invalid memory pages, the contents of the active memory status register are copied to Memory Register B which is located in RAM, and any other initialization is performed as indicated by block 204. The swap segment is erased-setting all locations in the swap segment to ^FF, and the corresponding byte in the Memory Register B is also set to ^FF to indicate a clean swap segment. Valid memory pages from the highest memory segment having an invalid page are then copied into the swap segment starting with the highest available page of the swap segment. As the pages are copied, Memory Register B is updated to mark the pages of the application segment invalid and the pages of the swap segment as containing valid information.

When all of the valid pages of the application segment have been copied to the swap segment, Memory Register B is copied to the inactive memory status register, in this case Memory Register C, and Memory Register C becomes the active memory status register. Memory Register A is now erased. Until step 206, a power outage would erase the RAM containing Memory Register B and the device would lose track of the memory changes made up until step 206. The loss of the changes would not be significant since the memory management routine would be re-run upon power up using information stored in Memory Register A, and the same pages—which still contain valid data—recopied to the same locations. Once Memory Register C becomes the current memory status register, however, the routine will jump from block 200 to block 208 when power is restored.

After the Memory Register B is copied to Memory Register C, the application memory segment is cleaned. The memory segment only contains invalid pages. Some of the invalid pages were marked invalid prior to initiating the memory management routine and the remainder were marked invalid when the data was copied to the swap segment by step 210. The contents of the swap segment are then copied to the clean application memory segment in step 212. If there are additional valid application pages in the following segments, one or more of the additional pages are copied to the current application segment, as shown in step 214, to fill the current application segment. Alternate embodiments could copy these additional pages to the swap segment, filling the swap segment prior to erasing the application memory segment. Copying the additional pages to the swap segment, however, results in an additional write sequence that takes execution time and wears the swap memory. Therefore, it is preferable to simply copy the additional pages of valid data directly to the application memory segment.

Once the current application segment is filled with valid data pages, Memory Register B is copied to Memory Register A and Memory Register A becomes the valid memory status register instead of Memory Register C. Memory Register C is erased at this time. The memory management routine then returns to step 202 and checks if additional segments of the memory need to be cleaned.

FIG. 3 lists the contents of the three memory registers during a memory management compression operation. In line 1 of FIG. 3, Memory Register A is active and lists the status of each of the 16 pages of memory. Pages 23, 22, 20, 18, 17, and 15 have valid application programs stored in them as indicated by the ^FE in the memory register. Pages 21, 19, 16, and 14 contain application programs that need to be erased s indicated by the ^FC in the memory register. Page 12 contains valid data as indicated by the ^7E in the memory register. Page 13 is empty as indicated by the ^FF in the memory register.

In line 2 of FIG. 3, the memory management routine is initialized and the data from Memory Register A is copied to Memory Register B. Line 3 shows Memory Register B updated after the swap segment is cleared. In line 4, the application code from pages 23, 22, and 20 has been (copied to the swap segment and pages 23, 22, and 20 have been marked as invalid.

If the system were to lose power at this point, Memory Register B would be lost since it is stored in RAM. Upon power up, the system would revert to using Memory Register A and resume the memory management routine. Since none of the original data has been erased at this point—but merely marked as invalid in Memory Register B—reverting to Memory Register A would not cause the system to lose valid data. Instead, the swap area containing data from pages 23, 22, and 20 would be erased a second time and refilled with the data from pages 23, 22, and 20.

In line 5, Memory Register B is copied to non-volatile Memory Register C and Register C becomes the valid register. Should the memory management routine be interrupted, upon power up Memory Register C would be used to restart the memory management routine. In line 6, pages 23–20 are cleaned and their status as clean pages updated in Memory Register B. Line 7 shows the swap segment copied to pages 23–20. Of course, since both page 20 and the fourth page of the swap segment, page 8, are empty, copying page 8 into page 20 has no effect.

In line 8, the next good page, in this case page 18, is copied into the empty page of the first sediment, page 20 and page 18 is marked invalid. When all of the pages of the in the first segment have been filled with good application data, or when there are no more pages of good application data, Memory Register B is copied to the non-volatile Memory Register A.

The process described in lines 3–9 is repeated in lines 10–16 for the next segment. First, the swap segment is cleared and the valid data pages from the second segment are copied to the swap segment. Memory Register B is copied to Memory Register C which becomes the active memory register should a power failure occur. The second segment is cleaned and the swap segment copied into it. The second segment is then filled, to the extent possible, with additional good application code from later pages. Memory Register B is then copied to Memory Register A.

At this point, shown in line 16, pages 23–18 contain valid application code. Pages 17, 16, and 13 are clean, pages 15 and 14 have invalid application code stored in them, and page 12 has valid data stored in it. Since there are no more valid pages of application code, the process repeats, as shown in lines 17–22 for the valid data. Since the data is to be packed into low memory, it is copied to the lowest available page of the swap segment before being recopied to the third segment. As seen in FIG. 3, the position of the data page did not change due to the memory management routine, but the remainder of the third segment has been cleared. Of course, valid data could change position.

Thus, although there has been disclosed to this point a particular embodiment for a low-cost system and method for managing memory that is immune from data loss caused by power interruptions, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of managing memory usage, said memory organized in at least two segments, each segment comprising at least two pages, said method comprising the steps of:

determining a sequence of memory pages;

checking each page of memory in sequence to determine if the information in the memory page is valid;

detecting a first invalid memory page in a first segment;

copying valid memory pages from said first segment to a swap segment;

erasing said first segment;

copying said swap segment to said first segment;

erasing said swap segment; and continuing with said checking step until all segments have been checked.

2. The method of claim 1, further comprising the step of:

filling said swap segment with information from valid pages following said first invalid memory page in said first segment in said sequence of memory pages prior to said step of copying said swap segment to said first segment.

3. The method of claim 1, further comprising the step of:

filling said first segment with additional valid pages prior to said continuing step.

4. The method of claim 1, further comprising the step of tracking the status of each page by the use of at least one memory status register.

5. The method of claim 1, further comprising the step of tracking the status of each page by the use of at least three memory status registers.

6. The method of claim 1, further comprising the step of tracking the status of each page by the use of at least three memory status registers each having a memory location corresponding to each of said pages and used to indicate a status of said corresponding page.

7. The method of claim 6, further comprising the steps of:

setting all bits in a given memory location of said memory status register to indicate said corresponding page is empty;

clearing at least one bit of said given memory location to indicate said corresponding page contains valid data; and clearing at least one additional bit of said given memory location to indicate said corresponding page contains invalid data.

8. A memory management system comprising:

a memory, said memory comprised of at least two segments, each of said at least two segments comprised of at least two pages; and three memory status registers, a first and a third of said memory status registers being non-volatile, each of said memory status registers having a memory location for storing the status of each of said pages of said memory, said status indicating at least whether the corresponding page of said memory contains valid information, invalid information, or no information, each of said first and third memory status registers capable of being a current memory status register where one of said first and third memory status registers is designated as being said current memory status register;

wherein said memory management system copies said current memory status register to a second of said memory status registers and updates the status of said memory pages in said second memory status register as said memory is compressed, said second of said memory status registers periodically copied to a non-current one of said first and third memory status registers such that upon interruption of power to said memory management system, said memory management system is able to maintain the integrity of said memory.

9. The memory management system of claim 8, wherein said memory is a FLASH memory.

10. The memory management system of claim 8, wherein said status of said memory pages is indicated by setting all bits when a given page is erased, clearing a first bit when valid data is written to said given page, and clearing a second bit when data in said given page is no longer valid.

11. The memory management system of claim 8, each of said segments comprised of four pages.

* * * * *